Sept. 9, 1958     W. A. KUHN, JR     2,851,128
FLUTTER DAMPER WITH THERMOSTATIC VALVE
Filed Feb. 8, 1956     2 Sheets-Sheet 1
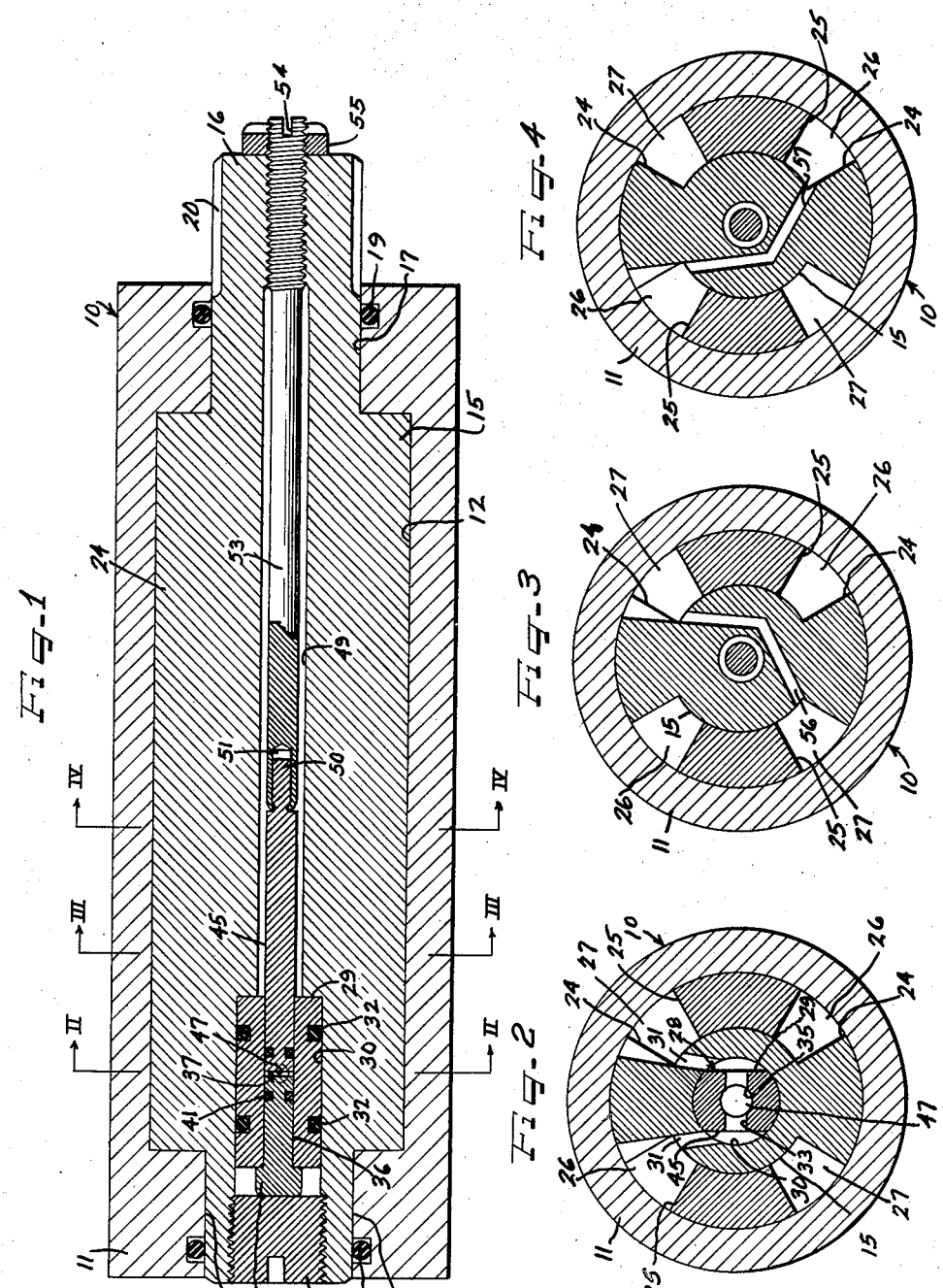
Inventor
WILLIAM A. KUHN, JR.

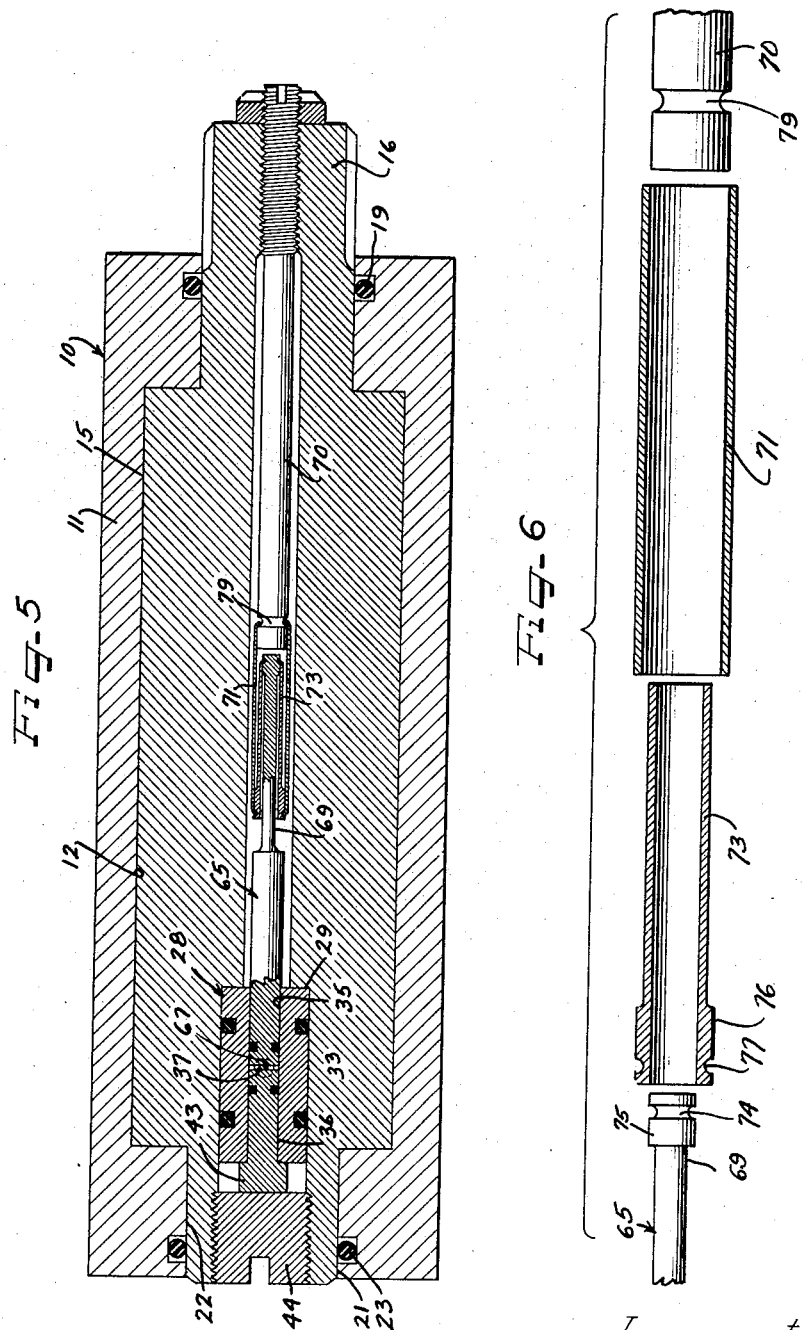

United States Patent Office 2,851,128
Patented Sept. 9, 1958

2,851,128

FLUTTER DAMPER WITH THERMOSTATIC VALVE

William A. Kuhn, Jr., Detroit, Mich., assignor to Houdaille Industries, Inc., Detroit, Mich., a corporation of Michigan Application February 8, 1956, Serial No. 564,283

9 Claims. (Cl. 188—93)

This invention relates to improvements in dampers and orifice valves therefor.

A principal object of the invention is to provide a novel and improved form of damper and differential expansion orifice therefor, arranged with a view toward providing a constant damping effect over a wide range of temperature variations.

A further object of the invention is to provide a simple and improved differential expansion orifice valve for flutter dampers and the like utilizing the difference in linear rate of expansion of different metals to provide a substantially constant damping effect.

Another object of the invention is to provide a simple and improved differential expansion orifice particularly adapted for flutter dampers and the like so arranged as to provide substantially the same hydraulic exit and entrance conditions to the flow of fluid from one working chamber to the other of the damper for each direction of flow of the fluid.

A still further object of the invention is to provide a simple and improved form of flutter damper having a novel and improved form of differential expansion orifice incorporated as a part thereof, so arranged as to provide substantially the same torque output over a wide range of temperature variations in each direction of rotation of the damper.

A still further object of the invention is to provide a flutter damper and differential expansion orifice valve therefor arranged with a view toward a reduction in parts, simplified sealing of the valve and ease of assembly and disassembly of the damper and valve.

Still another object of the invention is to provide a flutter damper of the hydraulic rotary piston type wherein a rotary vane piston and cylinder move relatively with respect to each other, to damp out the vibration of the movable airfoil attachments of the aircraft, and wherein the damping effort is maintained constant for each direction of the damper and over a wide range of temperature variations by the provision of a differential expansion orifice utilizing the difference in linear expansion rates of different metals of the valve and by the provision of balancing ports between complemental working chambers of the damper.

These and other objects of the invention will appear from time to time as the following specification proceeds and with reference to the accompanying drawings wherein:

Figure 1 is a schematic longitudinal sectional view taken through a flutter damper constructed in accordance with the invention;

Figure 2 is a transverse sectional view taken substantially along the line II—II of Figure 1 and showing certain details of the orifice control valve in cross section;

Figure 3 is a sectional view taken substantially along line III—III of Figure 1, showing the balancing ports connected between two complemental working chambers;

Figure 4 is a sectional view taken substantially along line IV—IV of Figure 1, and showing the balancing ports connected between two other complemental working chambers;

Figure 5 is a schematic sectional view illustrating a modified form in which my invention may be embodied; and Figure 6 is an enlarged view of the expansible valve plug shown in Figure 4; showing the parts in exploded relation with respect to each other.

In the embodiment of the invention illustrated in the drawings, reference character 10 designates generally a flutter damper of the rotary piston type capable of being contained in free working relation within the front or joint portion of a movable surface member of an airplane airfoil assembly, such as, an elevator or wing (not shown), to dampen the tendency of the airfoil assembly to flutter.

The flutter damper 10 comprises an elongated housing 11, which may be mounted coaxially with the hinge axis of a pivoted airfoil member and may be attached thereto by suitable attachment means (not shown). The housing 11 may thus be rigidly secured to the movable control member of the airplane for rocking movement about the axis of movement of the control member, as the latter swings or tends to swing or flutter.

The flutter damper 10 is of a rotary vane hydraulic piston type of damper operating on the principle of the absorption of energy by a metered and valved control of the displacement of hydraulic fluid between opposed working chambers of the damper, and permitting intentional movement of the control structure, but resisting vibrational or sudden or rapid movements of the control structure.

The housing 11 has an interior cylindrical wall 12 defining a chamber within which is mounted a rotary vane piston or wing shaft 15. The rotary vane piston 15 has an outer end portion 16 rotatably carried in a bearing portion 17 of the housing 11, and sealed thereto as by O-ring 19. The portion 16 of the wing shaft extends outwardly of the housing 11 and has a splined outer end portion 20 serving as a means for attachment to a correspondingly internally splined attachment (not shown), which may be attached to a stationary portion of the airfoil member. An opposite end portion 21 of the wing shaft 16 is rotatably carried in a bearing portion 22 of the housing 11 and sealed thereto as by an O-ring 23.

The wing shaft 15 is shown as having diametrically opposed wings 24 extending therefrom and conforming to and slidably engaging the cylindrical wall 12 of the housing 11 at their outer ends. Mounted within the housing 11 and secured to the wall 12 between the wings 24 in diametrically opposed relation with respect to each other are fluid reaction members or dividers 25 conforming to the cylindrical wall 12 and slidably engaging the cylindrical surface of the wing shaft 15 between the wings 24 thereof. The fluid reaction dividers 25 with the wings 24 thus divide the chamber defined by the cylindrical wall 12 into complemental working chambers 26 and 27, the working chambers 26 operating in opposed relationship to complemental working chambers 27 and vice versa.

Fluid under pressure is displaced from the working chambers 26 to the working chambers 27 and vice versa upon relative movement between the housing 11 and wing shaft 15 under the control of a restricted orifice control valve 28 in a chamber 30 in the hollow interior of the wing shaft, through displacement ports 31 leading from the chamber 30.

The orifice control valve 28 includes a generally cylindrical spool 29 sealed to the chamber 30 as by O-rings 32, recessed within the wall of said spool and engaging the wall of the chamber 30 on opposite sides of a cross-drilled passage 33 in said valve spool, which passage intersects a hollow interior portion 35 of said valve spool, opening to opposite ends thereof.

The valve spool 29 may be made from steel or a material having substantially the same linear expansion rate as the wing shaft 15, and is shown as having a valve plug 36 extending within the hollow interior portion 35 thereof from the outer end thereof. The valve plug 36 has a plane inner end surface 37, the corners of which are sharp. The end surface 37 lies in a plane perpendicular to the axis of the orifice valve 28, and intersects and restricts the cross-drilled passage 33.

The valve plug 36 may be made from a material having a substantially higher rate of linear expansion than the rate of linear expansion of the valve spool 29 and the fit between said valve plug and the hollow interior portion 35 of the valve spool 29 may be such that no mechanical binding will occur over the expected temperature range to which the damper may be exposed.

The valve plug 36 is sealed to the hollow interior portion 35 of the valve spool 29 as by an O-ring 41, recessed within said valve plug and engaging the wall of the hollow interior portion 35. The valve plug 36 is provided with a head 43 abutting the outside or outer end of the valve spool 29. A threaded plug 44, threaded within the outer end of the reduced diameter portion 22 of the wing shaft 15 is provided to retain the valve plug 36 to the orifice valve 29 and to retain the valve spool 29 within the chamber 30.

Extending within the opposite end of the hollow interior portion 35 of the valve spool 29 from the valve plug 36 is a second valve plug 45, sealed to the hollow interior 35 of the orifice valve 29 and having a plane inner end face 47, terminating in parallel spaced relation with respect to the plane face 37 of the valve plug 36 and intersecting and restricting the cross-drilled passage 33. The plane inner end surfaces 37 and 47 of the valve plugs 36 and 45 respectively, thus form a restrictive orifice from one end of the cross-drilled passage 33 to the other, restricting the passage of fluid from a working chamber of decreasing volume to a working chamber of increasing volume during operation of the damper.

The valve plug 45 is made from a material having a substantially greater rate of linear expansion than the rate of linear expansion of the wing shaft 15, although the rate of expansion of the two valve plugs need not necessarily be the same. The shorter valve plug 36 may have the same rate of expansion as the valve spool 29 if desired. A suitable material from which the valve plugs 36 and 45 may be made is an aluminum alloy which has a coefficient of expansion twice as great as steel. Steel is a suitable material from which the valve spool 29 may be constructed. It should, however, be understood that various materials may be used for various damping conditions and that while the plug valve 36 may be made of aluminum, it may also be made from steel if desired, or of any other material which in combination with the valve spool 29 and valve plug 45 will maintain the flow of hydraulic fluid through the orifice defined between the end faces 37 and 47 of the valve plugs 36 and 45, respectively, substantially constant for the temperature variations to be encountered by the damper in operation.

The valve plug 45, like the valve plug 36, may fit within the hollow interior portion 35 of the orifice valve 29 with sufficient clearance to take care of the differences in expansion between the valve plug and orifice valve and to prevent binding between said valve plug and orifice valve over the expected range of temperature variations to which the damper may be subjected in operation.

The valve plug 45 extends from the orifice valve 29 along a drilled passageway 49 extending along the wing shaft 15 from the chamber 30 and opening to the end 16 of said wing shaft. As herein shown, the valve plug 45 has a reduced diameter outer end portion 50 extending within a drilled portion 51 of a valve stem 53. The valve stem 53 may be made from a material having substantially the same coefficient of expansion as the wing shaft 15 and may be crimped to the reduced diameter portion of the valve plug 45 to retain said valve stem to said valve plug and to adjustably move said plug upon turning movement of said stem. The valve stem 53 is shown as having threaded engagement with the outer end portion 16 of the wing shaft 15, and as extending outwardly therefrom, to afford a means for initially adjusting the space between the end faces 37 and 47 of the valve plugs 36 and 45, respectively. The threads of the valve stem 53 and interior threads of the wing shaft 15 may be relatively fine to provide a close adjustment between the faces 37 and 47, to provide the required restrictive orifice for a normal temperature range of operation of the damper. As herein shown, the outer end of the valve stem 53 is slotted, as indicated by reference character 54, to enable the valve plug 45 to be adjusted by a screw driver or like tool. A jam nut 55 is provided to lock the valve stem 53 and valve plug 45 in the desired position of adjustment with respect to the valve spool 29.

It should here be understood, that by varying the length of the valve plug 45, the total travel of the end face 47 of said valve plug may be varied upon changes in temperature, to suit the required damping conditions.

Figures 3 and 4 show a balancing passageway 56 connecting the chamber 27 together and a balancing passageway 57 connecting the chambers 26 together, to balance the conditions in the chambers 27, 27 and 26, 26 during each direction of operation of the damper and to make it unnecessary to provide separate sets of displacement ports 31 for each set of chambers 26 and 27, and thus cooperating with the restricted orifice formed between the end faces 37 and 47 of the valve plugs 36 and 45, respectively, to provide the same hydraulic flow path and torque output when the damper is rotating in either a clockwise or counterclockwise direction, and to provide the same entrance and exit conditions for the fluid flow during each direction of rotation of the damper.

In the modification of the invention illustrated in Figures 5 and 6, I have shown a damper 10, and orifice valve 28, like those shown in Figures 1 through 4, but have shown a valve plug 65 so arranged as to have a far greater linear expansion than the valve plug 45 shown in Figure 1. The same reference characters will, therefore, be applied to the same parts in Figure 5 as were applied in Figures 1 through 4.

The valve plug 65 extends within the opposite end of the valve spool 29 from the valve plug 36 with sufficient clearance to prevent binding between said plug and spool throughout the expected temperature range of operation of the damper and is shown as being sealed to the hollow interior portion 35 of the valve spool 29. The valve plug 65 has an inner end face 67 facing the end face 37 of the valve plug 36, the space between said faces forming a restricted orifice restricting the flow of hydraulic fluid from one end of the cross passageway 33 to the other.

The valve plug 65 is shown as having a reduced diameter outer end portion 69 connected with a stem 70 threaded within the end portion 16 of the wing shaft 15 by means of two sleeves 71 and 73, one extending within the other and having a different rate of linear expansion than the other.

The sleeve 73 is shown as being crimped to an annular recess 74 formed in a head 75 on the end of the reduced diameter end portion 69 of the valve plug 65. The sleeve 73 is made from material having a linear rate of expansion equal to or less than that of the wing shaft 15.

The sleeve 73 is shown as extending inwardly along the reduced diameter portion 69 of the valve plug 65 and as having an enlarged inner end portion 76 having an annular recess 77 therein, to which is crimped the sleeve 71. The sleeve 71 extends from the annular recess 77 along the sleeve 73 in radially spaced relation with respect thereto and is crimped at its outer end to an annular recess 79 extending about the inner end of the valve stem 70. The sleeve 71 is made from a material having a linear rate of expansion substantially the same as the linear rate of expansion of the valve plug 65. Both the sleeve 71 and the valve plug 65 have a linear rate of expansion substantially higher than the wing shaft 15, a suitable material for said sleeve and plug being aluminum, while a suitable material for the stem 70 and the wing shaft 15 being steel or any other material having a substantially lower rate of expansion than the rate of expansion of the valve plug 65 and sleeve 71.

The valve plug 65 of the modified form of my invention thus has a far greater length of travel for a given length of damper than the valve plug shown in Figure 1, and thus may provide a greater restriction of the restricted orifice in the cross passageway 33 than the valve plug 45 shown in Figure 1.

It will be understood from the foregoing that various modifications and variations in the present invention may be effected without departing from the spirit and scope of the novel concepts thereof.

I claim as my invention:

1. In the differential expansion orifice valve, a supporting member, a hollow valve spool carried thereby and having a cross passageway intersecting the hollow interior of said spool, a valve plug fixed at its outer end and extending within the hollow interior of said spool from one end of said spool and having an inner end face registering with and restricting said cross passageway and having a higher linear rate of expansion than the linear rate of expansion of said supporting member and a second valve plug extending within said valve spool from the opposite end of said spool from said first plug and having an inner end face terminating in registry with said cross passageway, and with the inner end face of said first mentioned valve plug forming a restrictive orifice restricting the passageway of fluid through said cross passageway, said second valve plug being of a material having a higher rate of linear expansion than the rate of linear expansion of said supporting member and being retained from movement at its outer end to effect a variation in the orifice between the ends of said valve plugs upon temperature variations.

2. In a differential expansion orifice valve, a supporting member, a hollow valve spool having a cross passageway intersecting the hollow interior of said spool, a valve plug extending within the hollow interior of said spool from one end thereof and fixed to said spool at the outer end of said spool, said valve plug having a plane inner face perpendicular to the axis of said spool intersecting and restricting said cross passageway, and a second valve plug extending within said valve spool from the opposite end thereof from said first mentioned valve plug and having a plane inner face parallel to the plane inner face of said first mentioned valve plug and intersecting said cross passageway, and with the inner face of said first mentioned valve plug forming a restricted orifice restricting the passage of fluid through said cross passageway, said second valve plug being fixed exteriorly of said valve spool in spaced relation with respect thereto, said valve plugs each being made from a material having a higher rate of linear expansion than the rate of linear expansion of said supporting member, to provide an orifice between the ends of said valve plugs having the same restrictive effect to the passage of hydraulic fluid through said orifice over a wide range of temperature variations.

3. In a differential expansion orifice valve particularly adapted for flutter dampers and the like, to control the passage of fluid from a working chamber of decreasing volume to an opposed working chamber of increasing volume, a piston having ports therein, one communicating with a working chamber of decreasing volume and the other communicating with a working chamber of increasing volume, a valve spool carried within said piston and having a cross drilled passageway communicating with said ports, said valve spool having a central passageway leading therethrough and opening to opposite ends thereof and intersected by said cross drilled passageway, a valve plug extending within said central passageway and secured to said spool adjacent the outer end of said spool and having a plane end face perpendicular to the axis of said passageway and intersecting said cross drilled passageway and restricting the same, a second valve plug extending within said central passageway from the opposite end thereof from said first mentioned valve plug and having an inner end face parallel to the inner end face of said first mentioned valve plug and registering with and restricting said cross drilled passageway, and with the end face of said first valve plug forming a restrictive orifice restricting the displacement of fluid from one of said ports to the other, each of said valve plugs being made from a material having a substantially higher linear rate of expansion than the linear rate of expansion of said piston and the second mentioned of said valve plugs being secured to said piston exteriorly of said valve spool to vary the orifice between the end faces of said valve plugs in accordance with temperature variations, to provide substantially the same restrictive effect to the displacement of fluid from one of said ports to the other over a wide range of temperature variations.

4. In a flutter damper of the character described, an elongated housing having an inner wall defining a cylindrical chamber, a hollow wing shaft within said chamber and having wings slidably engaging said inner wall and forming a rotatable piston, a plurality of fluid reaction dividers extending inwardly from said inner wall and rigidly mounted within said housing in the spaces between the wings of said wing shaft and having slidable engagement with said wing shaft, the spaces between said reaction dividers and the wings of said wing shaft defining a plurality of complemental working chambers certain of which operate in opposed relation with respect to others, displacement ports leading through said wing shaft from the hollow interior thereof and connecting an opposed working chamber to a complemental working chamber, balancing ports in said wing shaft connecting complemental working chambers together, and restrictive orifice valve means controlling the passageway of fluid through said displacement ports comprising a valve spool in the hollow interior of said wing shaft having a cross drilled passageway communicating with said displacement ports, a valve plug extending within said spool and retained thereto and having an inner end face intersecting said cross drilled passageway, a second valve plug extending within said valve spool from the opposite end thereof from said first valve plug and terminating in a plane intersecting said cross drilled passageway in spaced relation with respect to the end of said first mentioned valve plug, said second valve plug extending outwardly of said valve spool a substantial distance, means retaining said second valve plug to said wing shaft in spaced relation with respect to said valve spool, and both of said valve plugs being made from material having a greater rate of linear expansion than the rate of linear expansion of said wing shaft, to provide a restrictive orifice between the ends of said valve plugs providing a substantially constant restriction rate over a wide range of temperature variations.

5. In a flutter damper of the character described, an elongated housing having an inner wall defining a cylindrical chamber, a hollow wing shaft within said chamber and having wings slidably engaging said inner wall and forming a rotatable piston, a plurality of fluid reaction dividers extending inwardly from said inner wall and rigidly mounted within said housing in the spaces between the wings of said wing shaft and having slidable engagement with said wing shaft, the spaces between said reaction dividers and the wings of said wing shaft defining a plurality of complemental working chambers certain of which operate in opposed relation with respect to others, displacement ports leading through said wing shaft from the hollow interior thereof and connecting an opposed working chamber to a complemental working chamber, balancing ports in said wing shaft connecting complemental working chambers together, and restrictive orifice valve means controlling the passage of fluid through said displacement ports comprising a valve spool in the hollow interior of said wing shaft having a cross drilled passageway communicating with said displacement ports, a valve plug extending within said spool and retained thereto and having an inner end face intersecting said cross drilled passageway, a second valve plug extending within said valve spool from the opposite end thereof from said first valve plug and terminating in a plane intersecting said cross drilled passageway in spaced relation with respect to the end of said first mentioned valve plug, said second valve plug extending outwardly of said valve spool a substantial distance, a valve stem in axial alignment with the projecting end portion of said second valve plug and having connection with said valve plug, said valve stem being adjustably mounted in said wing shaft to adjustably move said second valve plug and to adjust the position between the end faces of said valve plugs, and said valve plugs each being of a material having a substantially greater linear rate of expansion than the rate of linear expansion of said hollow wing shaft to provide a varying orifice between the ends of said valve plugs, providing a substantial constant damping effect over a wide range of temperature variations.

6. A differential expansion orifice valve comprising a supporting member, a hollow valve spool carried thereby and having a cross passageway intersecting the hollow interior thereof, a valve plug fixed at its outer end and extending within said valve spool from one end thereof and terminating in registry with said cross passageway, a second valve plug extending within said valve spool from the opposite end thereof from said first plug and terminating in registry with said cross passageway, said second valve plug extending outwardly of said valve spool a substantial distance and being made from a material having a higher rate of linear expansion than the rate of linear expansion of said supporting member, a valve stem in axial alignment with said second valve plug and having substantially the same rate of linear expansion as the rate of linear expansion of said supporting member, and being fixed thereto and means connecting said valve stem with said valve plug and extending along said valve plug for a portion of the length thereof and having substantially the same rate of linear expansion as the rate of linear expansion of said valve plug.

7. A differential expansion orifice valve comprising a supporting member, a hollow valve spool carried thereby and having a cross passageway intersecting the hollow interior of said spool, a valve plug extending within said valve spool from one end thereof and abutting the outer end of said sleeve and secured thereto and terminating in registry with said cross passageway, a second valve plug extending within said valve spool from the opposite end thereof from said first valve plug and terminating in registry with said cross passageway, said second valve plug extending outwardly of said valve spool a substantial distance and being made from a material having a higher rate of linear expansion than the rate of linear expansion of said supporting member, a valve stem in axial alignment with said valve plug having substantially the same rate of linear expansion as the rate of linear expansion of said supporting member and being secured thereto at its end remote from said valve plug, and means connecting said valve stem with said valve plug comprising two telescoped sleeves, one having a higher rate of linear expansion than the other and being secured thereto.

8. A differential expansion orifice valve comprising a supporting member, a hollow valve spool carried thereby and having a cross passageway intersecting the hollow interior of said spool, a valve plug extending within said valve spool from one end thereof and abutting the outer end of said sleeve and secured thereto and terminating in registry with said cross passageway, a second valve plug extending within said valve spool from the opposite end thereof from said first valve plug and terminating in registry with said cross passageway, said second valve plug extending outwardly of said valve spool a substantial distance and being made from a material having a higher rate of linear expansion than the rate of linear expansion of said supporting member, a valve stem in axial alignment with said valve plug and secured at its end remote from said valve plug to said supporting member and being made from a material having a lower rate of expansion than the rate of expansion of said valve plug, and means connecting said valve stem with said valve plug including two telescoped sleeves, one having substantially the same rate of linear expansion as the rate of linear expansion of said valve plug and having connection with said valve stem, and the other having substantially the same rate of linear expansion as said valve stem and connecting said one sleeve with said valve stem.

9. A differential expansion orifice valve comprising a supporting member, a hollow valve spool carried thereby and having a cross passageway intersecting the hollow interior thereof, a valve plug extending within said valve spool from one end thereof and abutting and secured to an outer end portion of said sleeve and terminating in registry with said cross passageway, a second valve plug extending within said valve spool from the opposite end thereof from said first valve plug and terminating in registry with said cross passageway, said second valve plug extending outwardly of said valve spool a substantial distance and being made from material having a higher rate of linear expansion than the rate of linear expansion of said supporting member and having a sleeve of a lesser rate of linear expansion than the rate of linear expansion of said valve plug extending therealong from the outer end thereof, a second sleeve secured to the inner end of said first sleeve and extending outwardly along said first sleeve beyond the end thereof and having a higher rate of linear expansion than the rate of linear expansion of said first sleeve, a valve stem extending from said second sleeve and secured thereto at one end and having a lesser rate of linear expansion than the rate of linear expansion of said valve plug and being secured to said supporting member in fixed relation with respect to said valve spool to accommodate movement of said valve plug within said valve spool toward and from said first plug upon predetermined changes in temperature.

References Cited in the file of this patent

UNITED STATES PATENTS

| 697,644 | Moore | Apr. 15, 1902 |
| 1,686,381 | Jenny | Oct. 2, 1928 |
| 1,881,450 | Fox | Oct. 11, 1932 |
| 1,881,957 | Peo | Oct. 11, 1932 |
| 1,884,188 | Peo | Oct. 25, 1932 |
| 2,334,115 | Meredith | Nov. 9, 1943 |